Figure 1:
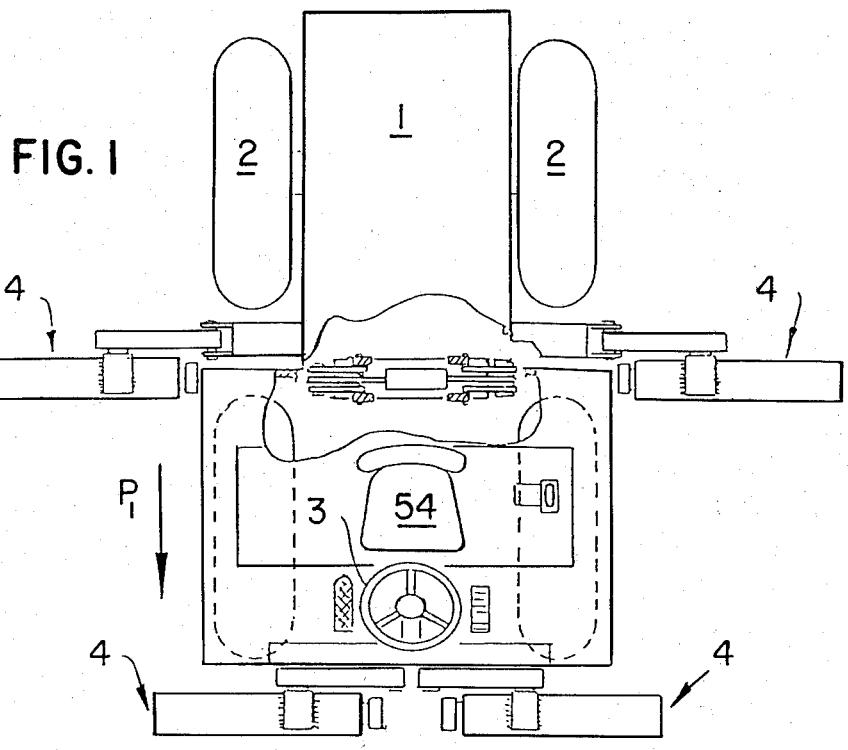

United States Patent [19]

Hoogstrate

[11] 4,384,443
[45] May 24, 1983

[54] MOWER

[75] Inventor: Gideon Hoogstrate, Goes, Netherlands

[73] Assignee: The Toro Company, Minneapolis, Minn.

[21] Appl. No.: 285,678

[22] Filed: Jul. 21, 1981

[30] Foreign Application Priority Data

Jul. 23, 1980 [NL] Netherlands .......................... 8004241

[51] Int. Cl.³ .......................................... A01D 69/00
[52] U.S. Cl. ........................................ 56/11.9; 56/7; 56/DIG. 11; 91/517
[58] Field of Search ................ 56/11.9, 6, 7, DIG. 11; 91/512, 517

[56] References Cited

U.S. PATENT DOCUMENTS

| | | | |
|---|---|---|---|
| 3,918,240 | 11/1975 | Haffner et al. | 56/11.9 |
| 3,992,858 | 11/1976 | Hubbard et al. | 56/11.9 |
| 4,120,233 | 10/1978 | Heiser et al. | 91/518 |
| 4,178,741 | 12/1979 | Lonn et al. | 56/7 |
| 4,214,506 | 7/1980 | Bernhardt | 60/484 |

Primary Examiner—Robert A. Hafer
Attorney, Agent, or Firm—James W. Miller

[57] ABSTRACT

A mowing machine comprises a plurality of cutting units (4) powered by a parallel hydraulic system with distributing means (30). The cutting units (4) are each powered by a hydromotor (16), all hydromotors (16) being driven by a central hydraulic pump (P). The hydromotors (16) are fed in a parallel relationship by the pump (P). Ahead of the hydromotor (16) in each circuit, is a distributing means (30) with an inlet (26) from the pump (P), and two outlets, (31) back to the supply tank (V), and (33) to the corresponding hydromotor (16). When a hydromotor (16) is deactivated, distributing means (30) automatically diverts the fluid normally flowing through the deactivated hydromotor back to the supply tank (V). This diversion of fluid prevents changing the speed of the remaining hydromotors as a result of increased flow or pressure available due to the deactivated hydromotor.

5 Claims, 5 Drawing Figures

MOWER

The invention relates to a device for mowing lawns and the like comprising a frame movable across the field, two or more mowing units carried by said frame, each of which is driven by a hydromotor, the hydromotors being fed in parallel relationship by a central hydropump.

Devices of the kind set forth comprising parallel connected mowing units have the advantage that the operation can be carried out by relatively low working pressures of the hydraulic liquid in contrast to the series-connected devices. A problem involved in the parallel relationship of the mowing units is, however, that when one of the mowing units is intentionally switched off, the other units gain speed because the hydromotors receive more liquid.

The invention has for its object to obviate this problem and to provide a mower in which the mowing units are fed in parallel relationship by the central pump.

The device according to the invention is distinguished by distributing means arranged in each supply duct to a hydromotor and communicating with a return duct, said means passing a higher rate of return flow into the return duct at an increase in pressure in the supply duct.

Owing to said distributing means it is now possible, for example, when one of the mowing units gets jammed, to automatically convey the redundant amount of hydraulic liquid back to the supply tank.

The distributing means is preferably constructed in the form of a housing having one inlet and two outlets communicating with said inlet, said outlets being adapted to be shut off by a movable element controlled by the pressure in the duct leading to the hydromoter. The element is preferably constructed in the form of a valve pivotable in the housing.

In order to obtain a simple embodiment the element is controlled by a piston-cylinder unit energized by the hydraulic liquid against the action of a reset spring.

In order to avoid choke losses or heat development respectively in the hydraulic liquid the return duct includes an excess-pressure valve for producing a given counter-pressure.

If the device is equipped with a mobile frame and if the mowing units are suspended to the frame by means of a pivotable lever system controlled by hydraulic rams, it is preferred to provide compression springs for lifting the leverage in order to reduce the ground pressure of the mowing units. This is particularly important when the mowing units are constructed in the form of rotatable cages.

In a preferred embodiment the springs are arranged around the lifting cylinder.

The invention will be described more fully hereinafter with reference to a few embodiments. The drawing shows in FIG. 1 a mobile mower comprising five mowing units in a plan view, FIG. 2 a front view of a mowing unit suspended to a leverage and the associated lifting cylinder, FIG. 3 a scheme of the hydraulic control used in the device of FIG. 1, FIG. 4 a schematic and perspective view of a first embodiment of the distributing means used in the hydraulic system of FIG. 3, FIG. 5 a plan view of a second embodiment of and distributing means.

Referring to FIG. 1, reference numeral 1 designates a frame movable in the direction of the arow P 1 across the field and carried by four ground wheels 2. The hindmost wheels are steered by means of the steering wheel 3, behind which the driver can sit down on the seat 4.

Behind the driver, between the rear wheels 2, a driving engine, for example, a Diesel engine is arranged, which drives a central hydraulic pump (not shown in detail). This pump provides the drive of the front wheels, the control of the rear wheels and of the mowing units 4 suspended to the frame 1. Five mowing units are provided, two behind arranged in front of and three behind the front wheels. Such a disposition of the mowing units is known and does not lie within the scope of the invention.

Each mowing unit, which may be formed by a rotatably drive cage 5 (see FIG. 2) or a rotatably driven disc (not shown), is suspended to a leverage formed by a rod 6 fastened to the cage holder, to which a tie rod 7 is pivoted. The rod 7 is rotatably connected with the frame 1 at a point 8.

An arm 9 is rigidly secured to the rod 7, to the free end of which is pivoted the piston rod 10 of a cylinder 11. The cylinder is supported at 12 by the frame 1. The cylinder is surrounded by a compression spring 13. One end of spring 13 bears against the piston 14 of rod 10 and the other end of spring 13 bears against a ring 15. Ring 15 has a screwthread connection with the exterior of cylinder 11 and can be axially displaced relative thereto to adjust the force exerted by spring 13 on piston rod 10.

Figure 2:
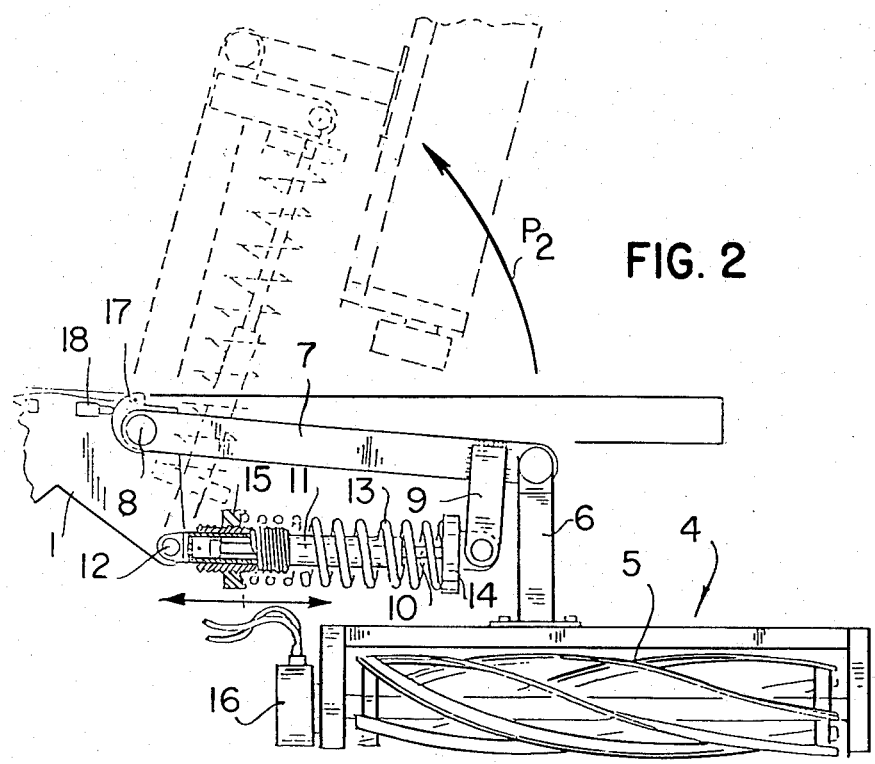

By supplying hydraulic liquid from the central pump to the cylinder 11, the piston rod is pushed outwards so that the rod 7 turns in the direction of the arrow P 2 until the position indicated by the broken line in FIG. 2 is attained. In this way each mowing unit can be elevated into a non-operating position.

When the mowing unit is lowered and the ring 15 is correctly set, the spring 13 will exert a given pressure on the arm 9 at a reduction of the pressure in the cylinder 11 so that part of the weight of the mowing unit is absorbed. Therefore, the mowing unit will not bear by its full weight on the field.

Each mowing unit 4 can be rotated by an individual hydromotor 16. Each hydromotor is connected with the central pump. As soon as the mowing unit is lifted, a lug 17 at the pivot point 8 of the lever rod 7 changes over a switch 18 included in the supply duct to the hydromotor 16. The switch 18 blocks the supply duct so that the mowing unit 4 is put out of operation.

Figure 3:
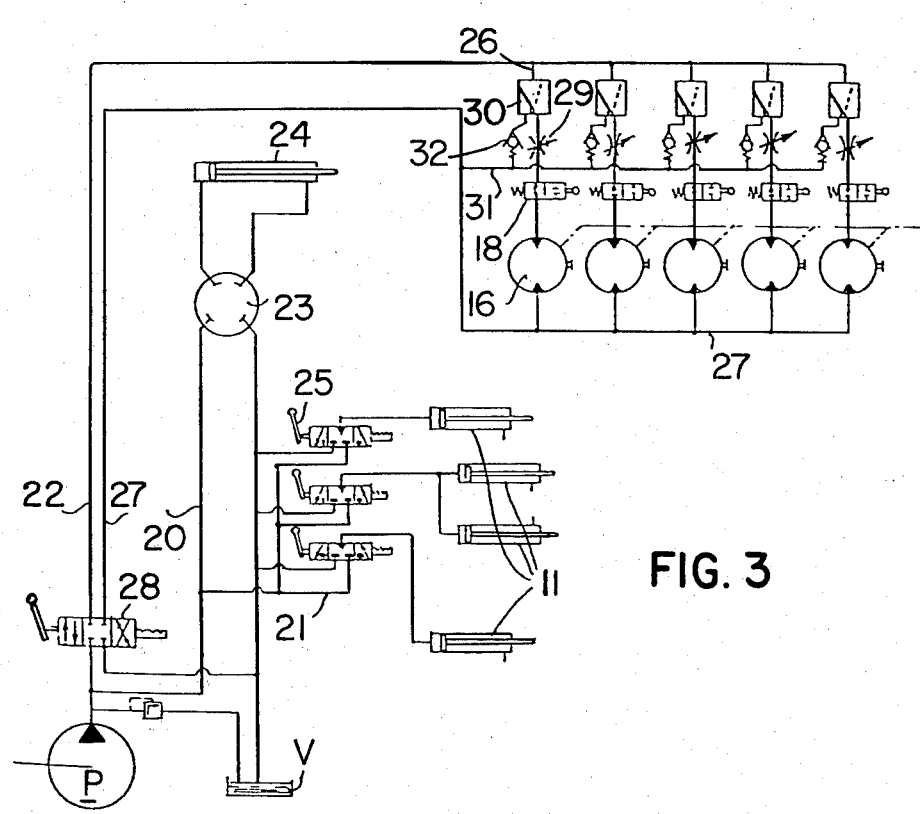

The foregoing will be explained more fully with reference to the description of the hydraulic scheme illustrated in FIG. 3. It is apparent therefrom that the central pump P driven by the Diesel engine feeds the ducts 20, 21 and 22. The duct 20 leads to a valve 23 controlled by the position of steering wheel 3, said valve 23 controlling a cylinder 24 for the steerable rear wheels 2.

Duct 21 is branched to three control-valves 25, which can be manually set by the operator, said valves leading to one or more lifting cylinders 11 for lifting the mowing units concerned.

Duct 22 defines a main supply line for fluid pressure and leads to each supply duct 26 of the hydromotor 16 for each mowing unit. The hydromotors 16 are connected in parallel and are also communicating with a return duct 27. The ducts 22 and 27 are controlled by a central control-valve 28, by means of which the operator can cause the hydromotors 16 to rotate in the forward or rearward sense respectively.

Directly in front of the hydromotor 16 the valve 18 is arranged to be actuated by a cam portion 17 at the end of lever rod 7. When the mowing unit 4 is lifted to its inoperative position shown in phantom in FIG. 2, cam portion 17 releases the plunger of valve 18 causing valve 18 to move from an open to a closed position. Hydromotor 16 is thus shut off since hydraulic fluid is now blocked by valve 18.

In front of the switch 18 in supply duct 26 is arranged an adjustable choke valve 29 by means of which the speed of each motor 16 can be separately adjusted. See FIG. 3.

In front of said choke valve 29 in supply duct 26 is arranged the distributing means 30 forming the main characteristic feature of the invention. See FIG. 3 this distributing means distributes the flow from the duct 26 either to the choke valve 29 or to the return duct 31, which communicates with the return duct 27. Between the distributing means 30 and the return duct is arranged an excess-pressure valve 32.

The purpose of the distributing means 30 is, when a hydromotor 16 is switched off, to prevent the amount of liquid intended to pass to said hydromotor 16 from flowing to the hydromotors 16 remaining operative, but rather to directly conduct it through a shortcircuiting duct 31 to the supply tank V. In this way the hydromotors are prevented from changing their speed as a result of the higher pressure or the higher amount of liquid supplied thereto.

The distributing means 30 will be explained more fully with reference to FIGS. 4 and 5.

Figure 4:
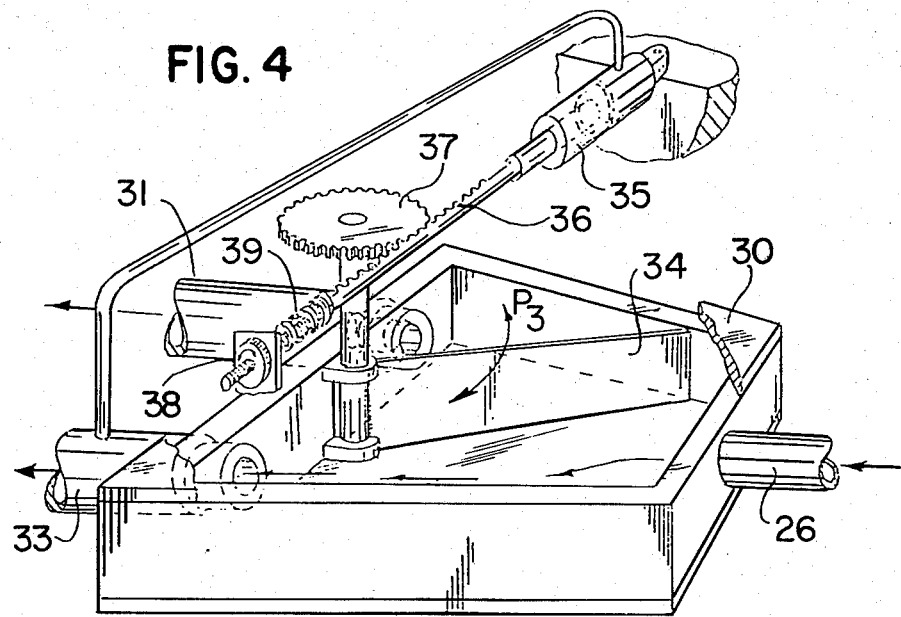

FIG. 4 shows a first embodiment of the distributing means 30 comprising a housing having one inlet communicating with the supply duct 26. This housing has two outlets. One outlet communicates with supply duct 33 to the hydromotor, duct 33 being merely a continuation of the supply duct 26, and the other outlet with the return duct 31 respectively.

The housing encloses a space accommodating a pivotable flap 34. The flap turns about a spindle 35 located between the outlets of the housing 1 so that, when the flap 34 turns in the direction of the arrow P 3, the medium flow from the duct 26 passes wholly or partly to the supply duct 33, the remainder being conducted away through the return duct 31. The outlet to the return duct 31 includes the adjustable excess-pressure valve 32.

The flap 34 is governed by a cylinder 35, which is fed by the hydraulic liquid from the supply duct 33, the pressure of which brings about a displacement of the piston slidable in the cylinder 35. The piston rod is provided with a toothed rack 36 co-operating with a toothed segment 37 on the spindle of the flap 34. The pressure of the liquid in the cylinder 35 is counteracted by a reset spring 39 adjustable by means of the knob 38.

The distributing means operates as follows: Under normal conditions the flap 34 occupies the position shown in FIG. 4, in which the flow of hydraulic fluid from the duct 26 is directly passed to the duct 33 and hence to the hydromotor 16.

As soon as the motor 16 is switched off, for example, by lifting the mowing unit with the aid of the cylinder 11 or due to jamming of the mowing cage 5, pressure will immediately build up in the duct 33 and propagate to the cylinder 35. This increase in pressure will move the piston rod to the left in FIG. 4 after the bias tension afforded by the reset spring 39 has been overcome. As the piston rod moves to the left in FIG. 4, the toothed rack 36 rotates the spindle flap 34 causing flap 34 to move from the position shown in FIG. 4 to a position where the supply duct 33 is closed and the return duct 31 is open. In the case of complete blocking of supply duct 33 by flap 34, the flow is conducted away through the return duct 31. The express-pressure valve 32 provides a given counterpressure so that the rate of flow through return duct 31 is not increased to an extent such that heat is developed in the liquid. Thus excessive heating is avoided so that oil coolers need not be provided.

Figure 5:
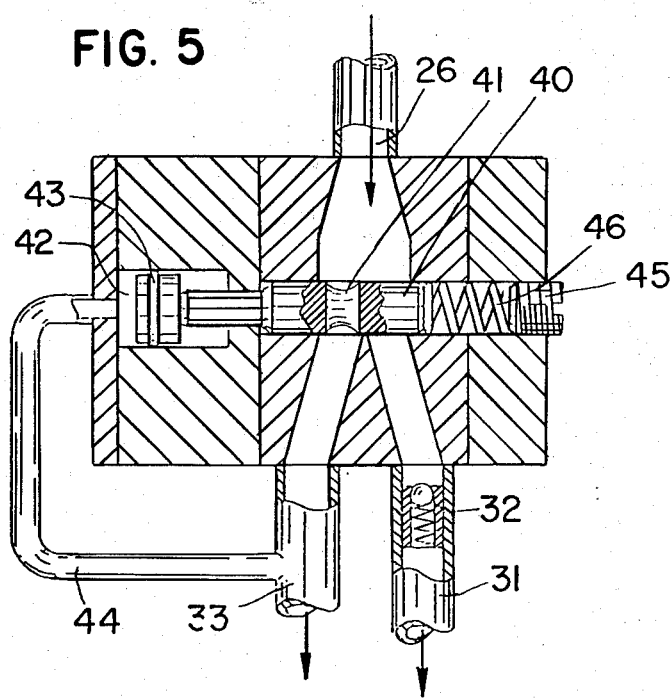

FIG. 5 shows a distributing means similar to that of FIG. 4, but the flap 34 is replaced by a sliding body 40 having a passage 41. The component parts corresponding with those of FIG. 4 are designated by the same reference numerals.

On one side of the sliding body 40 operates a piston 43 in the cylinder 42, which is displaced by the pressure of the liquid supplied through duct 44 from the duct 33. On the other side of the sliding body 40 there is arranged a reset spring 46 adjustable by means of the nut 45. The device operates in substantially the same manner, but by raising the pressure in the cylinder 42 the passage 41 in the sliding body 40 progressively shifts towards the passage to the return duct 31 so that the supply duct 33 to the hydromotor is shut off and the fluid flow is bypassed to the return duct 31.

The invention is not limited to the embodiments described above.

What is claimed is:

1. A power-driven movable device comprising:
   (a) a frame movable over a ground surface;
   (b) a plurality of rotatable tools carried by the frame;
   (c) a plurality of hydraulic motors with a separate hydraulic motor being connected to each tool for individually rotating the tool at a speed dependent upon the flow rate of hydraulic fluid delivered to the motor;
   (d) a hydraulic pressure source for delivering hydraulic fluid under pressure to a main supply line;
   (e) a supply duct connecting each hydraulic motor to the main supply line in a parallel arrangement relative to the other motors; and
   (f) distributing means in each of the supply ducts between the hydraulic motor and the main supply line for bypassing hydraulic fluid back to the pressure source when a corresponding hydraulic motor is shut off to avoid any increase in the flow rate of the fluid delivered to the hydraulic motors which are still operating, whereby the speed of rotation of the operating hydraulic motors remains constant regardless of the numbers of motors that are shut off.

2. A device as claimed in claim 1 characterized in that the distributing means is constructed in the form of a housing having an inlet and two outlets communicating herewith and adapted to be shut off by a movable element, said element being controlled by the pressure in the supply duct leading to the hydraulic motor.

3. A device as claimed in claim 2 characterized in that the element is formed by a flap pivotable in the housing.

4. A device as claimed in claim 2 characterized in that the element is controlled by a piston-cylinder unit energized by the hydraulic fluid against the action of a reset spring.

5. A power-driven movable device as claimed in claim 1, further including means for automatically actuating the distributing means in response to an increase in fluid pressure in the supply duct of the shut off hydraulic motor.

* * * * *